(12) United States Patent
Thorel et al.

(10) Patent No.: US 9,109,509 B2
(45) Date of Patent: Aug. 18, 2015

(54) UNIT FOR AN AIRCRAFT THRUSTER

(71) Applicant: AIRCELLE, Gonfreville l'Orcher (FR)

(72) Inventors: Christophe Thorel, Le Havre (FR); Bertrand Desjoyeaux, Sainte Adresse (FR); Florent Bouillon, Anglesqueville l'Esneval (FR); John Moutier, Le Havre (FR); Stéphane Bardin, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 288 days.

(21) Appl. No.: 13/671,233

(22) Filed: Nov. 7, 2012

(65) Prior Publication Data

US 2013/0315657 A1  Nov. 28, 2013

Related U.S. Application Data

(63) Continuation of application No. PCT/FR2011/051042, filed on May 9, 2011.

(30) Foreign Application Priority Data

May 7, 2010  (FR) ...................... 10 53578

(51) Int. Cl.
| B64D 33/02 | (2006.01) |
| F02C 7/04 | (2006.01) |
| B64D 29/06 | (2006.01) |
| F02C 7/045 | (2006.01) |

(Continued)

(52) U.S. Cl.
CPC . *F02C 7/04* (2013.01); *B64D 29/06* (2013.01); *F02C 7/045* (2013.01); *F02K 1/80* (2013.01); *F02K 1/827* (2013.01); *Y02T 50/672* (2013.01); *Y10T 29/49826* (2015.01); *Y10T 403/45* (2015.01)

(58) Field of Classification Search
CPC .............................. B64D 33/02; Y10T 403/45
USPC .................................. 244/54 B, 53 B
See application file for complete search history.

(56) References Cited

U.S. PATENT DOCUMENTS

| 4,452,565 | A | * | 6/1984 | Monhardt et al. ................ 415/9 |
| 5,581,054 | A | * | 12/1996 | Anderson et al. ............. 181/213 |
| 6,123,170 | A | * | 9/2000 | Porte et al. ..................... 181/214 |

(Continued)

FOREIGN PATENT DOCUMENTS

| EP | 1357279 | 10/2003 |
| EP | 1591643 | 11/2005 |

(Continued)

OTHER PUBLICATIONS

PCT/FR2011/051042 International Search Report.

*Primary Examiner* — Justin Benedik
(74) *Attorney, Agent, or Firm* — Brinks Gilson & Lione

(57) ABSTRACT

A unit for an aircraft thruster is provided that includes a first ferrule configured to be attached to a second ferrule and a first connection flange configured to be secured to a second corresponding connection flange secured to the second ferrule. The connection flange includes a portion forming a plane extending along a radial direction with respect to the first ferrule. A link between the first ferrule and the corresponding connection flange is offset to a distance from said plane corresponding to a length for damping a shear-generating flexural moment, generated by fluxes of forces passing through the first ferrule.

8 Claims, 3 Drawing Sheets

(51) Int. Cl.
*F02K 1/80* (2006.01)
*F02K 1/82* (2006.01)

(56) References Cited

U.S. PATENT DOCUMENTS

| | | | |
|---|---|---|---|
| 6,761,245 B2 * | 7/2004 | Porte | 181/210 |
| 7,503,425 B2 * | 3/2009 | Strunk | 181/214 |
| 8,763,753 B2 * | 7/2014 | Kray et al. | 181/292 |
| 2008/0206044 A1 * | 8/2008 | Porte et al. | 415/119 |
| 2010/0232932 A1 * | 9/2010 | Vauchel et al. | 415/119 |

FOREIGN PATENT DOCUMENTS

| | | |
|---|---|---|
| EP | 1927731 | 6/2008 |
| WO | 2010018314 | 2/2010 |

\* cited by examiner

UNIT FOR AN AIRCRAFT THRUSTER

CROSS-REFERENCE TO RELATED APPLICATIONS

This application is a continuation of International Application No. PCT/FR2011/051042 filed on May 9, 2011, which claims the benefit of FR 10/53578, filed on May 7, 2010. The disclosures of the above applications are incorporated herein by reference

FIELD

The present disclosure relates to a unit for an aircraft thruster and to a method for manufacturing such a unit.

BACKGROUND

The statements in this section merely provide background information related to the present disclosure and may not constitute prior art.

A nacelle, belonging to the thruster of the aircraft, generally has a structure comprising an air intake upstream from the turbine engine, a middle section intended to surround a fan of the turbine engine, a downstream section harboring thrust reversal means and intended to surround the combustion chamber of the turbine engine, and is generally completed by an ejection nozzle, the outlet of which is located downstream from the turbine engine.

The air intake comprises an intake lip adapted so that the air required for feeding the fan and internal compressors of the turbine engine may be optimally collected to the turbine engine on the one hand, and a downstream structure on which the lip is added and intended to properly channel the air towards the vanes of the fan on the other hand.

This downstream structure notably comprises an internal ring-shaped wall 1, illustrated in FIGS. 1 and 2, and an external cowl (not shown) radially spaced apart from the internal wall 1.

The internal wall 1 of the air intake structure is extended with a fan case belonging to the middle section of the nacelle in a direction parallel to the longitudinal axis of the turbine engine.

More particularly, the downstream end of the internal wall 1 of the air intake and the upstream end of the case of the fan each bear peripheral connection flanges 2,3 for assembling together said air intake and fan case, by means of attachment elements such as screws 4 or bolts.

In present air intake structures, as illustrated in FIGS. 1 and 2, the connection flange 2 of the air intake structure is respectively attached downstream from the acoustic panel of the internal wall 1 or on the acoustic panel itself by bolted elements 5.

The presence of the bolted elements 5 then requires local reinforcements in the flange plane which have an incidence on the mass of the air intake structure.

Further, such arrangements limit the dimensions of the acoustic panel of the internal wall 1 of the air intake structure, if it is desired not to deteriorate it by the arrangement of the bolted elements 5, as illustrated in FIG. 1.

Air intake structures are also known, in which the internal wall and the corresponding flange for connection to the fan case are integrated into a single part in composite material.

Now, in such a part, interlaminar shearing is seen at the adhesively bonded link between the flange and the acoustic panel of the internal wall.

There then exists a risk of delamination in the composite part which causes a significant lowering of the mechanical strength of the internal wall of the air intake structure, and even breaking of the latter.

SUMMARY

The present disclosure proposes a unit for an aircraft thruster comprising a first ferrule intended to be attached to a second ferrule and a first connection flange intended to be attached to a second corresponding connection flange secured to the second ferrule, said first connection flange comprising a portion forming a plane extending along a radial direction relatively to the first ferrule, remarkable in that the link between the first ferrule and the corresponding connection flange is offset to a distance from said plane corresponding to a length for damping a moment generated by fluxes of forces passing through said first ferrule under predetermined conditions of use of the unit.

By means of the present disclosure, the occurrence of delamination is avoided between the first ferrule and the connection flange, insofar that, at this particular distance, stressing the link between this ferrule and the corresponding connection flange is avoided.

According to various forms of the present disclosure, a unit according to the invention may comprise one or more of the following features, taken individually or in a technically possible combination:

the first ferrule is an internal ferrule of an air intake structure of a nacelle and/or of a structure of the reverser of the nacelle and/or of a turbine engine fan case;

the length l for damping said moment is defined in the following formula (1):

$$\ell = \frac{\sqrt{R \times e}}{\sqrt[4]{3 \times (1 - v^2)}} \quad (1)$$

wherein R and e respectively define the radius and the thickness of the first ferrule and v is the Poisson coefficient of the material forming the first ferrule at right angles to the flange plane;

the first ferrule and the first corresponding connection flange are made in a single part in composite material;

the first connection flange is in metal material;

the first ferrule further comprises a transition corner intended to be put into place at right angles to the plane of the first flange between the latter and the first ferrule;

the first ferrule further comprises a reinforcement plate added onto the connection flange.

The present disclosure also relates to a method for manufacturing a unit as mentioned above, comprising a step in which a link between the first ferrule and the corresponding connection flange is offset to a distance from the flange plane corresponding to a length for damping a moment generated by fluxes of forces passing through said first ferrule under predetermined conditions of use of the unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Other features and advantages of the present disclosure will become apparent upon reading the detailed description which follows, according to embodiments given as non-limiting examples and with reference to the appended drawings wherein.

Figure 1:
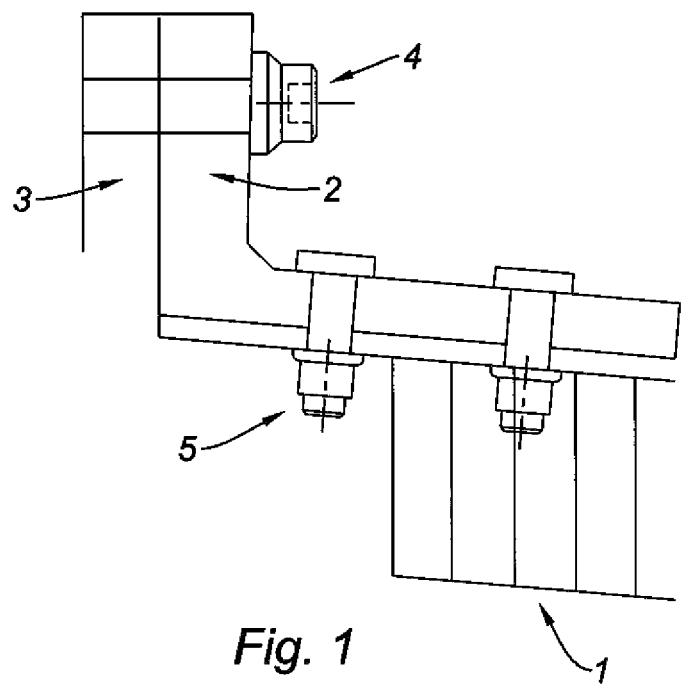
FIGS. 1 and 2 illustrate partial sectional views of two assemblies of an air intake structure and of a fan case of the state of the art.
Figure 2:
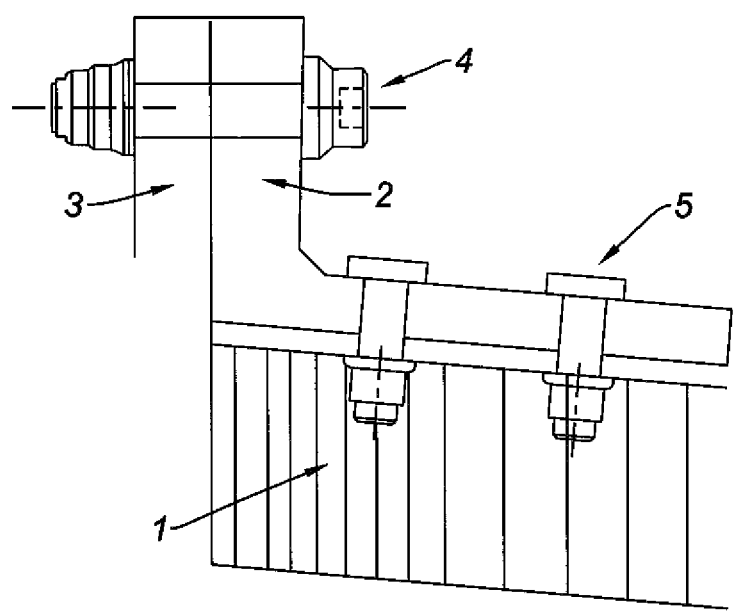

The drawings described herein are for illustration purposes only and are not intended to limit the scope of the present disclosure in any way

DETAILED DESCRIPTION

The following description is merely exemplary in nature and is not intended to limit the present disclosure, application, or uses. It should be understood that throughout the drawings, corresponding reference numerals indicate like or corresponding parts and features.

An aircraft turbine engine nacelle has a structure comprising an air intake, a middle section surrounding a turbine engine fan, and a downstream section surrounding the turbine engine and generally harboring a thrust reversal system.

The air intake structure is divided into two areas, i.e. a ring-shaped intake lip with an aerodynamic profile adapted so that the air required for feeding the fan and internal compressors of the turbine engine may be optimally collected to the turbine engine on the one hand, and a downstream structure comprising a ring-shaped internal ferrule and a ring-shaped external cowl radially spaced apart from the internal ferrule on the other hand, an internal ferrule onto which is added the lip and intended to properly channel the air towards the fan.

Figure 3:
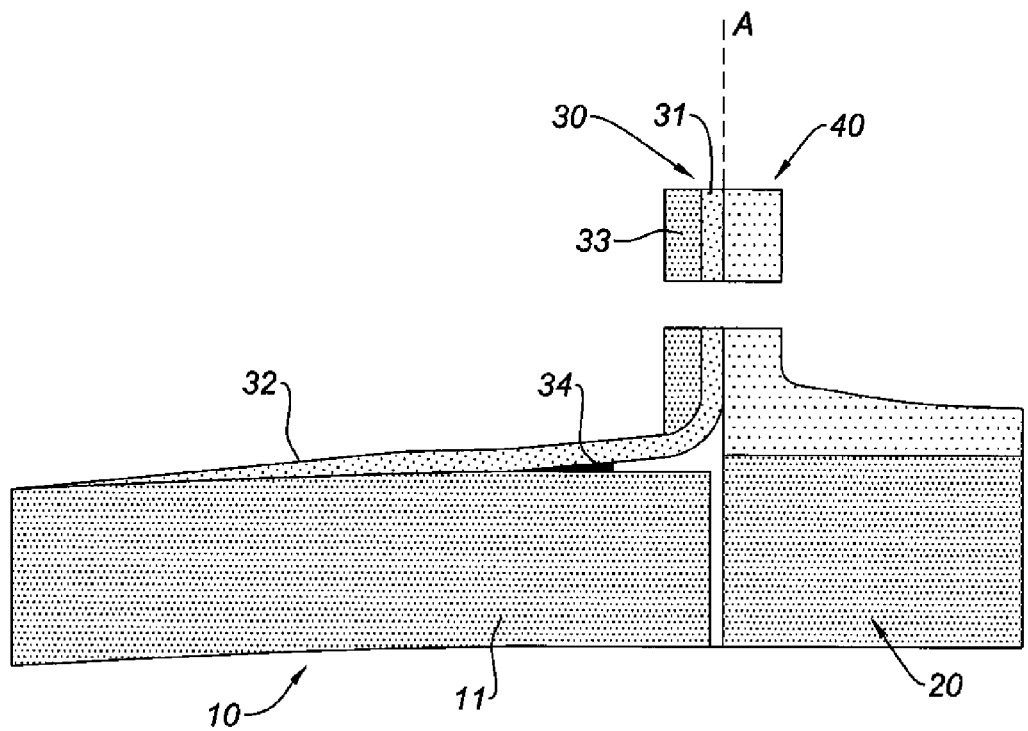
FIG. 3 is a partial sectional view of an embodiment of an assembly of an air intake structure and of a fan case according to an embodiment of the present invention.

Such a ferrule is designated by the general reference 10 in FIG. 3.

This internal ferrule 10 of the air intake structure is conventionally treated in order to form an acoustic structure 11 for damping sound waves.

It may include an internal skin permeable to air, an external skin permeable to air and a honeycomb cell core.

Other alternative forms of the present disclosure may be contemplated, such as replacement of the cell core with porous foam or microspheres.

The middle section, as for it, comprises an internal case 20 surrounding the fan of the turbine engine extending the internal ferrule 10 of the air intake structure on the one hand and an external structure for fairing the case extending the external cowl of the air intake structure on the other hand.

The internal ferrule 10 is intended to be attached to the fan case 20 in a junction plane designated by the letter A, by means of peripheral ring-shaped connection flanges 30,40 placed on the downstream end of the internal ferrule 10 and on the upstream end of the fan case 20, respectively.

Each connection flange 30,40 comprises a first connection portion 31 forming a flange and extending along a radial direction and a second tubular connection portion 32 with a substantially cylindrical shape extending along the longitudinal direction of the turbine engine, so that the longitudinal section of the connection flange is L-shaped.

However, other configurations of the connection flanges may be proposed.

Each of the connection flanges 30,40 protruding outwards at the periphery of the internal ferrule 10 of the air intake and of the fan case 20 are pressed against each other by a suitable attachment means, parallel to the longitudinal axis of the turbine engine and intended to cross passages facing each other in each of the connection flanges 30,40.

The connection flange 30 of the internal ferrule 10 is thus connected by any known means (not illustrated in FIG. 3) such as bolts, to the connection flange 40 of the case 20 at the junction plane A.

Moreover, regardless of the configuration, the different connection flanges 30, 40 may be associated with centering means with which centering of the air intake structure may be ensured to the fan case 20 respectively.

According to the form illustrated in FIG. 3, the second connection portion 32 of the flange 30 corresponding to the internal ferrule 10 of the air intake structure is intended to be attached onto said ferrule 10.

More specifically, this second connection portion 32 forms a part in composite material with the internal ferrule 10 of the air intake structure.

This form has the advantage of suppressing any attachment such as bolts or screws, which may alter the acoustic quality of the internal ferrule 10.

According to the present disclosure, the link between the internal ferrule 10 and the corresponding connection flange 30 is offset to a distance from the first portion 31 of the flange 30 corresponding to a characteristic quantity of a moment generated by fluxes of forces passing through said internal ferrule under predetermined conditions of use of the nacelle.

These conditions are understood as being conditions under which the turbine engine is operating and notably when the aircraft is operating during take-off, flight and landing phases but also on the ground.

Indeed, the adhesively bonded link between the flange 30 and the acoustic panel 11 of the internal ferrule 10 is stressed by forces in the plane, i.e. tension, compression and shearing in the plane, which lead to a flexural moment at the aforementioned link generating interlaminar shearing.

Figure 5:
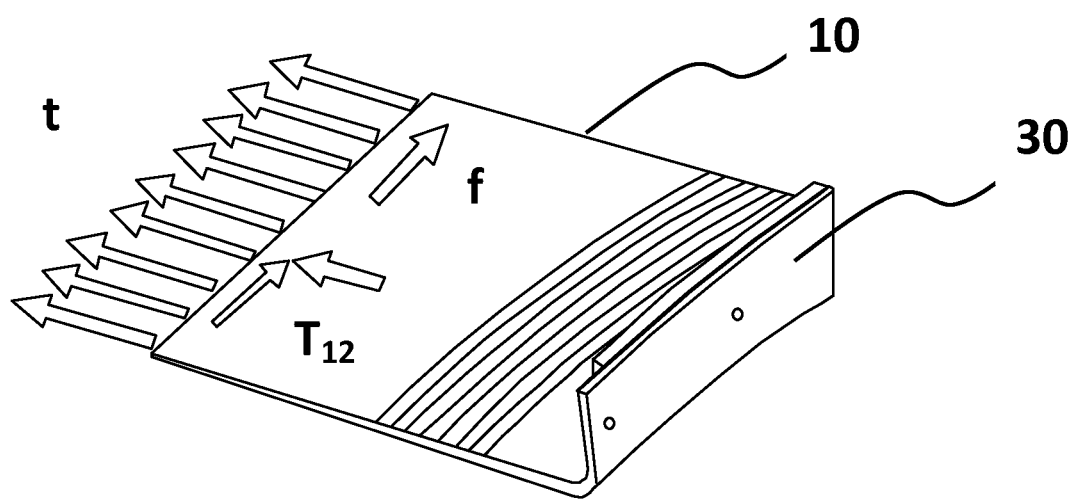
FIG. 5 is a partial perspective view of a ferrule of the assembly of FIG. 3 in which the different fluxes of forces present on the ferrule are shown.

More specifically, with reference to FIG. 5, the adhesively bonded link between the flange 30 and the acoustic panel of the internal ferrule 10 is stressed by fluxes of forces in the ferrule 10 i.e. tension and axial compression designated by t, tension and circumferential compression designated by f and planar shearing designated by $t_{12}$ and both associated arrows, shearing in the wall of the ferrule 10.

The tension and axial compression lead to a flexural moment at the aforementioned link generating interlaminar shearing, at the interface between the flange 30 and the ferrule 10.

The link between the connection flange 30 and the internal ferrule 10 of the air intake structure is substantially achieved at the length l for damping this moment.

Such a damping length is defined by the following formula:

$$\ell = \frac{\sqrt{R \times e}}{\sqrt[4]{3 \times (1-v^2)}} \quad (1)$$

wherein:
R is the radius of the ferrule,
e is the thickness of the ferrule,
v is the Poisson coefficient of the material forming the ferrule at the first portion of the flange.

In a non-limiting example of the present invention for a quasi-isotropic structure i.e. for which the number of plies at 45° is equal to the number of plies at 0°, the damping length may be defined by the following approximate formula (2):

$$l = 0.8 \times \sqrt{R \times e} \quad (2)$$

In a non-limiting example of the present invention, for a material at the scale of a future narrow body, the damping length l is of the order of 50 mm.

In the embodiment of FIG. 3, the connection flange 30 is in composite material.

It should be noted that the length for damping the aforementioned moment is the length at which the moment becomes negligible.

Therefore, at this particular distance, flexural stressing of the link between the internal ferrule 10 and the corresponding connection flange 30 is avoided, by which it is possible to reduce the risks of delamination, notably when the paths are in composite material.

Indeed, the acoustic panel of the internal ferrule 10 at this distance is not subject to the flexural forces generated at the connection flange 30.

With such a link it is also possible to integrate the connection flange 30 to the acoustic panel 11 of the internal ferrule 10 by suppressing the acoustic junction areas which play the role of a sound bridge.

The acoustic quality of the internal ferrule 10 is thereby improved.

Further, with such a link it is possible to use an acoustic panel 11 comprising a low density honeycomb at right angles to the connection flange 30, which provides the advantage of promoting reduction in the mass of the panel 11 and of increasing the acoustic surface of the latter.

However, an alternative embodiment may propose a connection flange 30 in a metal material, the link of which with the internal ferrule 10 will be made to the aforementioned damping length.

Figure 4:
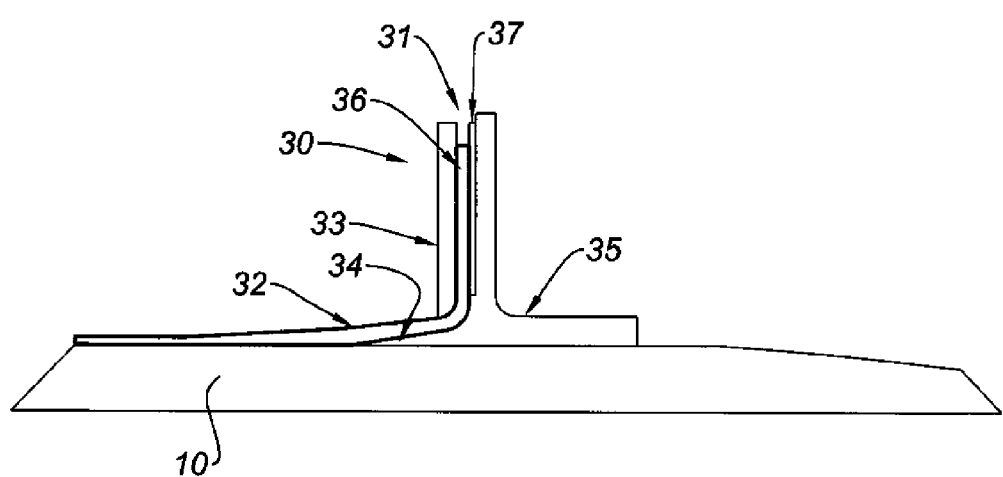
FIG. 4 is a detailed sectional view of a method for manufacturing a connection flange of a ferrule of the assembly of FIG. 3.

Moreover, with reference to FIGS. 3 and 4, a reinforcement plate 33 may be added onto the first connection portion 31 of the flange 30 corresponding to the internal ferrule 10, attached to the flange 30 through a suitable means, if demanded by the requirements in terms of structural strength of the connection flange 30.

Further, an alternative form of the present disclosure proposes insertion of a transition corner 34 between the internal ferrule 10 and the connection flange 30 at right angles to the first connection portion 31 of the flange 30.

This corner is placed in the transition area between the internal ferrule 10 and the second connection portion 32 of the flange 30.

In a non-limiting example of the present disclosure, this corner 34 is a profile having a section with a generally triangular shape.

This profile is formed with glass or carbon plies, as well as with a filling resin.

In an alternative form, this profile may be formed by pultrusion.

This transition corner 34 provides the advantage of improving material health in the flange 30/ferrule 10 transition area i.e. it gives the possibility of avoiding deformation of the fabrics in the location where it is placed.

Further, its presence reduces a stress concentration area in the aforementioned transition area.

Moreover, as illustrated in FIG. 4, during the manufacturing of the connection flange 30 on the internal ferrule 10 of the air intake structure, a counter-form 35 is set into place, with a shape matching that of the associated connection flange 30 which is desirably formed and symmetrical relatively to the latter.

More specifically, this counter-form 35 is placed beside a rear skin 36 of the connection flange 30 which has been baked beforehand.

For this, tooling for positioning a counter-form, known to one skilled in the art, is used and will not be described in more details subsequently.

As illustrated in FIG. 4, the connection flange 30 also comprises sacrificial plies 37, placed behind the rear skin 36.

The connection flange 30 will then be draped on the counter-form 35/rear skin 36 assembly.

The invention is not limited to the various forms of this nacelle, described above as examples, but on the contrary it encompasses all the alternatives.

The description of the invention is merely exemplary in nature and, thus, variations that do not depart from the substance of the disclosure are intended to be within the scope of the disclosure. Such variations are not to be regarded as a departure from the spirit and scope of the disclosure.

Thus, the invention applies to any ferrule of a unit for an aircraft thruster comprising a connection flange and, notably to a structure of the reverser of the nacelle and/or to the case surrounding the fan of the turbine engine comprising an acoustic damping structure and to the corresponding connection flange.

What is claimed is:

1. A unit for an aircraft thruster comprising:
   a first ferrule configured to be attached to a second ferrule at a junction plane wherein the first ferrule does not overlap the second ferrule; and
   a first connection flange configured to be secured, at the junction plane, to a second corresponding connection flange secured to the second ferrule, said first connection flange comprising a first connection portion extending along a radial direction with respect to the first ferrule and a second tubular connection portion attached on the first ferrule,
   wherein a vertical gap between the first ferrule and the second tubular connection portion of said first connection flange increases as the second tubular connection portion approaches the junction plane in order to dampen a shear-generating flexural moment, generated by fluxes of forces passing through the first ferrule.

2. The unit according to claim 1, wherein the first ferrule is an internal ferrule of at least one of an air intake structure of a nacelle and/or of a structure of a reverser of the nacelle and/or of a fan case of a turbine engine.

3. The unit according to claim 1, wherein the length l for damping said moment is defined in the following formula (1):

$$\ell = \frac{\sqrt{R \times e}}{\sqrt[4]{3 \times (1 - v^2)}} \qquad (1)$$

wherein R and e respectively define a radius and thickness of the first ferrule, and v is the Poisson coefficient of a material forming the first ferrule at right angles to the junction plane.

4. The unit according to claim 1, wherein the first ferrule and the first connection flange are made in one piece in a composite material.

5. The unit according to claim 1, wherein the first connection flange is a metal material.

6. The unit according to claim 1, wherein the first ferrule further comprises a transition corner configured to be set into place at right angles to the junction plane between the latter and the first ferrule.

7. The unit according to claim 1, wherein the first ferrule further comprises a reinforcement plate added onto the first connection flange.

8. A method for manufacturing the unit according to claim 1, comprising a step in which the vertical qap between the first ferrule and the second tubular connection portion of said first connection flange increases as the second tubular connection portion approaches the junction plane in order to dampen the shear-generating flexural moment, generated by fluxes of forces passing through the first ferrule.

\* \* \* \* \*